United States Patent Office 3,036,086
Patented May 22, 1962

3,036,086
METHOD FOR THE POLYMERIZATION OF VINYLTETRAZOLES MONOMERS
Arnold Adicoff, China Lake, Calif., assignor to the United States of America as represented by the Secretary of the Navy
No Drawing. Filed May 5, 1959, Ser. No. 811,227
6 Claims. (Cl. 260—308)
(Granted under Title 35, U.S. Code (1952), sec. 266)

The invention described herein may be manufactured and used by or for the Government of the United States of America for governmental purposes without the payment of any royalties thereon or therefor.

This invention relates to new and improved ways to prepare vinyltetrazole polymers.

Prior methods of preparing vinyltetrazole polymers failed to give products which were completely free of contaminants or in a form which was easily handled or processed. Bulk polymerization yielded products which had to be ground, chopped, or dissolved in a solvent and reprecipitated in a non-solvent. Solution polymerization left the polymer in solution and it had to be precipitated therefrom. Emulsion polymerization left the product contaminated with various additives.

Further, in grinding or chopping the bulk polymer, difficulty is encountered achieving uniform particle size; degradation also usually occurs. Further, considerable time is spent performing the operation.

Dissolution of the bulk polymer and reprecipitation is time consuming and expensive, requiring large volumes of solvent and precipitant to make large amounts of polymer. Furthermore, the friability of the precipitate depends upon the particular combination of solvent and precipitant employed.

The emulsion polymer is contaminated with various additives used to promote the polymerization which are difficult to remove without destroying particle discreteness.

It is therefore an object of this invention to provide a method of preparing vinyltetrazole polymers which yields a friable product which will give a fine powder of uniform particle size when finely crushed.

Another object is to provide a method for preparing said polymers which eliminates the necessity for large volumes of solvents and precipitants.

Another object is to reduce the time required to prepare said polymers.

A final object is to provide a method for preparing said polymers which has the aforementioned advantages and which is free of contaminants.

The objects are accomplished by dissolving the vinyltetrazole monomer in a solvent in which is dissolved a free radical source. The solution is then treated to remove any dissolved oxygen which would inhibit the polymerization. Polymerization is initiated by decomposition of the free radical source which is in turn initiated by irradiation of the solution, by use of a reducing agent, or by heating the solution. The solution is then stirred until polymerization begins, as is noted by the onset of turbidity. At this point, all agitation is stopped as its continuance causes the formation of undesirable sludge. After several hours, polymerization is complete and a white suspension results. Filtration of the suspension leaves a white cake which when dried is easily crushed to a fine powder of uniform particle size which is ready for use in moldings and extrusions without any further purification.

The reaction is exothermic and provision must be made to cool the solution during the reaction so that the solvent does volatilize so that the rate and degree of polymerization can be controlled.

Suitable solvents in which to carry out the polymerization are benzotrifluoride and isoamyl bromide.

Suitable free radical sources are: benzoyl peroxide, diacetyl peroxide, di-t-butyl peroxide, di-α-cumyl peroxide, dipropyl peroxide, diisopropyl peroxide, isopropyl-t-butyl peroxide, n-butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, transdecalin hydroperoxide, α-methylbenzyl hydroperoxide, cumene hydroperoxide, α-methyl-α-ethyl benzyl hydroperoxide, tetraline hydroperoxide, triphenylmethyl hydroperoxide, diphenylmethyl hydroperoxide, dichlorodantoin, $\alpha,\alpha'$-azo bis(isobutyronitrile), $\alpha,\alpha'$-azo 2-methyl butyronitrile, $\alpha,\alpha'$ 2-methyl heptonitrile, 1,1' azo 1-cyclohexane carbonitrile, dimethyl $\alpha,\alpha'$ azo isobutyrate, 4,4' azo 4-cyanopentanoic acid and other nitrosoacylaryl amines.

Oxygen inhibits the polymerization as aforesaid and is removed for instance by flushing the solution with an inert gas both before the initiation of polymerization and maintaining an inert blanket during polymerization, or by creating a vacuum over the solution before the initiation of polymerization and then conducting the polymerization in a closed vessel.

Polymerization is initiated specifically by irradiation of the solution with X-rays, gamma rays, electrons, or ultra violet rays, by adding reducing agents such as dimethyl aniline and cobalt naphthenate, or by raising the temperature of the solution so that a sufficient number of free radicals are formed by decomposition of the initiator. The latter method is preferred.

The amount of monomer used ranges from about 0.5 part by weight to about 50 parts while the amount of solvent ranges from about 99.5 parts by weight to about 50 parts. The amount of free radical source ranges from about 0.05 part by weight to about 10 parts. The temperature at which the reaction is carried out ranges from about 0° C. to about 100°.

The degree of polymerization can be controlled by the concentration of the free radical source, by the amount of and rate at which the radiation is supplied to the solution, by the amount of and rate at which the reducing agent is added, and by controlling the temperature of the solution. The degree of polymerization can be further controlled by the presence or absence of chain transfer agents such as carbon tetrachloride, bromoform, chloroform, certain mercaptans and allylic compounds. Such transfer agents are not necessary to produce useful polymers however.

Following are several specific examples of the process, but the examples are by no means limiting of such.

*Example 1.*—20 grams of 2-methyl-5-vinyltetrazole, 180 grams of benzotrifluoride, and 0.5 gram of benzoyl peroxide are placed in a resin kettle. The kettle is flushed with helium and heated without stirring to 80° C. and the temperature maintained. The polymer forms as a white suspension and the reaction appears complete after about six hours.

*Example 2.*—20 grams of 2-methyl-5-vinyltetrazole, 180 grams of benzotrifluoride, and 0.2 gram of $\alpha$-$\alpha'$ azobisisobutyronitrile are placed in a resin kettle, the kettle flushed with helium and heated to 80° C. with agitation until the onset of turbidity. The agitation is then discontinued and the bubbler positioned above the level of the liquid in the kettle; the temperature of the solution is kept at 80° for about six hours. A white suspension results.

Polymeric 2-methyl-5-vinyltetrazole prepared by the foregoing techniques were found to have an infra-red spectrum similar to that of the polymer prepared by other methods and identified by analysis. It was found to have an intrinsic viscosity of about 0.5 deciliter per gram in dimethyl formamide at 30° C.

The utility of the vinyl-substituted tetrazole polymers is illustrated by that for a typical polymer, poly-2-methyl-5-vinyltetrazole. This polymer is a new ordnance material having application as an ingredient in clean, slow burning gas generator compositions, in new igniter compositions as substitutes for black powder, a new family of homogeneous high energy propellants, a new series of high energy plastic bonded explosives and strongly adherent match head compositions for squib bridge wires. The adaptation of the polymer for the above applications is based on its property of undergoing a sustained decomposition to its elements under pressure in the absence of oxidizers, its property of dissolving certain new high energy explosives, its property of desensitizing high explosives, its high thermal and vacuum stability, chemical inertness and its good bonding characteristics with metals, glasses, and organic and inorganic solids.

An application of poly-2-methyl-5-vinyltetrazole is in fuel compositions for gas generators used to power servo-mechanisms in missiles and in other applications. For this application the polymer is used with ammonium nitrate as an oxidizer, the oxidizer being coated with the polymer. In making the composition the oxidizer is suspended in a solution of polymer in chloroform, the solvent is evaporated and the residue of polymer-coated oxidizer is dried, ground and pressed into pellets for use. Formulations of 13.2 percent of poly 2-methyl-5-vinyltetrazole and 86.8 percent ammonium nitrate, which have a pressed density of 1.67 g./cc. and which are stoichiometric to an equimolar mixture of CO and $CO_2$, $H_2O$ and $N_2$, burn cleanly without added catalyst at a rate suitable for gas generator use (0.94 in./sec. at 1,000 p.s.i.). The pressure exponent of burning is approximately one. The linear coefficient of expansion is roughly $75 \times 10^{-6}$. Unconfined pellets burn smoothly without the separation of burning particles and without coning or flash-down even when uninhibited. If inhibited with a thin dip coat of ethylcellulose, the pellets will burn normally even when loosely confined in a tube. This formulation ignites readily with standard igniters at pressures of 600 p.s.i. and higher. Pressed charges can be easily capped during pressing with a layer of ammonium perchlorate-polymer composition to ensure faster ignition. A formulation containing 50.8 percent polymer and 49.2 percent ammonium nitrate, stoichiometric to CO, $H_2$ and $N_2$ has a calculated heat of explosion of 219 cal./g. The pelleted formulation has burning rates of 0.06 in./sec., 0.09 in./sec. and 0.25 in./sec. at 500, 1,000 and 1,600 p.s.i. respectively.

2-methyl-5-vinyltetrazole is prepared according to the method disclosed in copending application Serial Number 732,780 filed April 29, 1958, by William G. Finnegan, Ronald A. Henry and Sol Skolnik. This method is as follows:

1- AND 2-METHYL-5-VINYLTETRAZOLES

5-Hydroxyethyltetrazole

A mixture of 213 g. (3.0 moles) of hydracrylonitrile, 214.8 g. (3.3 moles) of sodium azide, 176.7 g. (3.3 moles) of ammonium chloride and 1500 ml. of dimethylformamide, recovered from a previous synthesis, is heated at 123°–127° C. with stirring for 24 hours. The dimethylformamide is then removed at 100° C. under reduced pressure (ca. 20 mm.). Care should be taken to remove the dimethylformamide in this operation as completely as possible. The residue of sodium chloride and 5-hydroxyethyltetrazole is then dissolved in 250 ml. of water and made basic with a solution of 140 g. (3.5 moles) of sodium hydroxide in 250 ml. of water. The temperature should be maintained at ca. 25° C. during this step to prevent excessive foaming. The solution is then stripped to about half volume at reduced pressure on a steam bath. The pH of the solution at this time should be nine or higher. If the pH is lower than nine, additional base should be added and the evaporation continued until the pH remains at nine or higher. The solution is then cooled to room temperature and acidified to about pH 2 with 300 ml. of concentrated hydrochloric acid (or more if additional base had been used). It is advantageous at this point to cool the solution to 5° C. and remove the precipitated sodium chloride by filtration. The filter cake is washed with 95 percent ethanol and the filtrate combined with the product solution. The acidified product solution and alcohol washings are then stripped of solvents at 100° C. under reduced pressure. The 5-hydroxyethyltetrazole is then extracted from the residue with one 500 ml., one 250 ml. and one 125 ml. portions of cold 95 percent ethanol and neutralized to a phenolphthalein endpoint by the addition of a solution of 197.4 g. (3.0 moles) of 85 percent potassium hydroxide in 625 ml. of 95 percent ethanol with stirring and cooling.

1- and 2-Methyl-5-(2-Hydroxyethyl)Tetrazoles

The 3.0 moles of potassium 5-hydroxyethyltetrazole in 1500 ml. of 95 percent ethanol from the previous reaction is placed in a 3 liter, 3 necked flask. Potassium bicarbonate (30 g., 0.3 mole) is added and 417 g. (3.3 mole) of dimethyl sulfate is added dropwise with stirring over a 30 minute period. The temperature of the solution is maintained at 28–33° C. during the addition and for an additional 30 minutes and then raised to 40–45° C. for 30 minutes. The solution is then cooled to 5° C. The precipitate of potassium methylsulfate is removed by filtration and the filter cake is washed with several portions of 95 percent ethanol. The combined ethanol filtrates are evaporated to dryness at reduced pressure on a steam bath.

The 1- and 2-methyl-5-(2-hydroxyethyl)tetrazoles are extracted from the residue with a total of 350 ml. of chloroform and the chloroform solution is dried for one hour with magnesium sulfate, or alternatively by azeotropic distillation of part of the chloroform. (If the vacuum stripping of the ethanol and water in the previous step is thorough, the chloroform solution should be essentially dry. Care should be taken that the chloroform solution is dry before the chlorination reaction.)

1- and 2-Methyl-5-(2-Chloroethyl)Tetrazoles

The solution of 1- and 2-methyl-5-(2-hydroxyethyl)-tetrazoles in 350 ml. of chloroform from the preceeding methylation reaction is cooled to 5° C. and 330 ml., 537 g. (4.5 moles) of thionyl chloride is added with stirring at a rate such that the reaction temperature does not rise above 25° C. The solution is then heated to reflux for four hours, or longer if necessary, to complete the evolution of hydrochloric acid and sulfur dioxide. The chloroform and excess thionyl chloride are then removed at reduced pressure on a steam bath. The heating at reduced pressure should be thorough to ensure complete removal of any thionyl chloride, but it is also essential that there be excess thionyl chloride at the end of the reflux period. The residue of products is then cooled to room temperature and dissolved in 300 ml. of chloroform. Water (200 ml.) is added and the mixture is stirred and cooled to 5° C. Solid sodium bicarbonate is then added, with stirring and cooling in sufficient quantity (0.2–0.3 mole/mole) to bring the pH of the mixture to 6–7. The chloroform layer is then separated and the water layer is extracted with an additional 100 ml. portion of chloroform. The combined chloroform solutions are dried with magnesium sulfate and stripped to dryness at reduced pressure on a steam bath. The residue of mixed 1- and 2-methyl-5-(2-chloroethyl)tetrazoles is then heated to 100° C. at 10–20 mm. pressure and stripped of the low boiling impurities present. 2-methyl-5-(2-chloroethyl)tetrazole is then removed from the mixture of chloro compounds by high vacuum distillation.

2-Methyl-5-Vinyltetrazole

The 2-methyl-5-(2-chloroethyl)tetrazole from the preceding reaction is dissolved in 250 ml. of methanol and the solution is heated to reflux. A solution of approximately 98.5 g. (1.5 moles) of 85 percent potassium hydroxide in 500 ml. of methanol is then added dropwise with stirring over a period of one hour and the reaction is stirred and refluxed for an additional hour. The solution is then cooled to room temperature, neutralized to pH 6–7 with concentrated hydrochloric acid and one gram of hydroquinone is added. The methanol is removed by distillation at atmospheric pressure on a steam bath. The residue of salts and products is cooled to room temperature and the products are extracted with one 150 ml. and two 50 ml. portions of methylene chloride. The methylene chloride solution is dried with magnesium sulfate and the solvent is removed by distillation at atmospheric pressure on a steam bath. The 2-methyl-5-vinyltetrazole is removed from the mixture of crude products by distillation at 20 mm. pressure; B.P. ca. 80° C., $N_D^{25} \sim 1.4800$.

1-Methyl-5-Vinyltetrazole 1-methyl-5-(2-chloroethyl)tetrazole separated from the residue of mixed 1- and 2-methyl-5-(2-chloroethyl)tetrazoles as outlined above was used in this example. A solution of 229 g. of undistilled but partially purified 1-methyl-5-(2-chloroethyl)tetrazole in 275 ml. of dried, distilled N-methylmorpholine was heated under reflux on the steam bath for eight hours.

(The crude 1-methyl-5-(2-chloroethyl)tetrazole remaining after the 2-isomer has been removed by distillation is a dark brown, murky oil. Its appearance can be greatly improved by dissolving it in toluene (4.5 ml. per gram) is room temperature, stirring with decoloring charcoal, filtering and evaporating. The treatment with toluene precipitates much dark tar. The resulting chloro compound is clear and orange-yellow in color. The recovery from 260 g. of crude product was 229 g.

(N-methylmorpholine was chosen as the tertiary base for this dehydrohalogenation for several reasons: (1) The chloro compound is readily and completely miscible in this solvent. By way of contrast, the chloro compound is only poorly soluble in triethylamine. (2) The moderate boiling point of about 104° C. at 785 mm. permits easy removal of excess solvent from the monomer without overheating; furthermore, if the reaction becomes vigorous, the boiing of the excess amine will serve to moderate and maintain a reasonable temperature. (3) The hydrochloride separates from the reaction solution as coarse, easily filterable crystals with little or no tendency to gum.)

A very definite exothermic reaction was noted about one-half hour after heating commenced; the heating was discontinued for a few minutes until this vigorous reaction ceased. The solution was cooled to 5° C., diluted with 600 ml. of fresh diethyl ether, and recooled to 5° C. The precipitated N-methylmorpholine hydrochloride was removed by filtration and washed with two 100 ml. portions of diethyl ether. The combined extracts were evaporated under reduced pressure (15 mm.) and to a final pot temperature of 100° C. The yield was 156.6 g. An additional quantity of less pure material was obtained by extracting the cake of N-methylmorpholine hydrochloride with several portions of methylene chloride, and evaporating the methylene chloride.

(Although the pure 1-methyl-5-vinyltetrazole is only sparingly soluble in diethyl ether, this monomer is apparently reasonably soluble in the mixture of diethyl ether and the unreacted N-methylmorpholine. The monomer is much more soluble in methylene chloride; however, this solvent is not recommended since it also extracts any polymer and tars which are formed during the dehydrohalogenation; the crude monomer so obtained is more difficult to handle in the molecular still.

(The weight of dried N-methylmorpholine hydrochloride remaining after the methylene chloride extraction was 191.8 g., or 89.3 percent theory.)

The crops of impure 1-methyl-5-vinyltetrazole were distilled separately in a falling-film, molecular-still at a pressure of about one micron and a jacket temperature of about 120° C. The total yield of canary yellow product was 151 g. (87.8%); $n_D^{25} = 1.5046$. Two additional distillations in a molecular still gave an almost water-white monomer ($n_D^{25} = 1.5044$) which crystallized between 15 and 20° C. when seeded.

Other vinyltetrazoles which may be polymerized by the process of the invention are 1- and 2-vinyltetrazoles, 1- and 2-vinyl-5-aminotetrazoles and 1-methyl-5-vinyltetrazoles. Methods for making these monomers are disclosed in the above cited copending application Serial Number 732,780. Other vinyltetrazoles and substituted vinyl tetrazoles, allyltetrazoles and substituted allyltetrazoles, as well as other alkene tetrazoles and substituted alkene tetrazoles may be polymerized by the process.

Obviously many modifications and variations of the present invention are possible in the light of the above teachings. It is therefore to be understood, that within the scope of the appended claims, the invention may be practiced otherwise than as specifically described.

What is claimed is:

1. A method for the preparation of polymerization products of vinyltetrazole monomers which comprises heating a vinyltetrazole monomer in a solvent selected from the class consisting of benzotrifluoride and isoamyl bromide to which has been added a free radical source selected from the class consisting of benzoyl peroxide and α-α′-azobisisobutyronitrile at a temperature from about 0° C. to about 100° C. until a white friable precipitate forms.

2. A method for the preparation of polymeric 2-methyl-5-vinyltatrazole comprising reacting 2-methyl-5-vinyltetrazole in benzotrifluoride to which α-α′-azobisisobutyronitrile has been added in an inert atmosphere at a temperature of 80° C. for about six hours when a white suspension forms.

3. A method for the preparation of polymeric 2-methyl-5-vinyltetrazole comprising reacting 2-methyl-5-vinyltetrazole in benzotrifluoride and benzoylperoxide in an inert atmosphere at a temperature of 80° C. for about six hours when a white precipitate forms.

4. A method for the preparation of polymerization products of vinyltetrazole monomers which comprises reacting a vinyltetrazole monomer in a solvent selected from the class consisting of benzotrifluoride and isoamyl bromide to which has been added a free radical source selected from the class consisting of benzoyl peroxide and α-α′-azobisisobutyronitrile, at a temperature from about zero to about 100° C. until a white suspension forms.

5. The method of claim 4, further characterized by addition of a reducing agent selected from the class consisting of dimethyl aniline and cobalt naphenate to the solvent.

6. The process for preparing vinyltetrazole polymers which comprises the steps of dissolving from 0.5 part to 50 parts by weight of monomer in a solvent from the class consisting of benzotrifluoride and isoamyl bromide ranging from about 99.5 parts by weight to 50 parts to which a free radical source from the class consisting of benzoyl peroxide and α-α′-azobisisobutyronitrile ranging from about 0.05 part by weight to about 10 parts has been added, and heating to a temperature ranging from 0° C. to 100° C. until a white suspension appears.

References Cited in the file of this patent

UNITED STATES PATENTS

| | | |
|---|---|---|
| 2,335,454 | Schuster et al. | Apr. 20, 1943 |
| 2,367,660 | Agre | Jan. 23, 1945 |
| 2,471,959 | Hunt | May 31, 1949 |

OTHER REFERENCES

Waters: "Chemistry of Free Radicals," pp. 8–19, 195–200 (1946), Oxford Univ. Press.